United States Patent
Wyatt et al.

(10) Patent No.: US 7,400,802 B2
(45) Date of Patent: Jul. 15, 2008

(54) ADJUSTABLE SUPPORT DEVICE FOR OPTICAL COMPONENTS AND METHODS OF USE

(75) Inventors: Mike Wyatt, Rancho Santa Margarita, CA (US); Thomas Rigney, Silverado, CA (US)

(73) Assignee: Newport Corporation, Irvine, CA (US)

( * ) Notice: Subject to any disclaimer, the term of this patent is extended or adjusted under 35 U.S.C. 154(b) by 0 days.

(21) Appl. No.: 11/523,118

(22) Filed: Sep. 18, 2006

(65) Prior Publication Data

US 2007/0065086 A1   Mar. 22, 2007

Related U.S. Application Data

(60) Provisional application No. 60/718,480, filed on Sep. 19, 2005.

(51) Int. Cl.
G02B 6/26 (2006.01)
G02B 6/00 (2006.01)

(52) U.S. Cl. .......................... 385/52; 385/136

(58) Field of Classification Search ................ 385/52, 385/136
See application file for complete search history.

(56) References Cited

U.S. PATENT DOCUMENTS

| | | | | |
|---|---|---|---|---|
| 4,603,944 A | * | 8/1986 | Greenlaw et al. ........... | 359/818 |
| 4,840,450 A | * | 6/1989 | Jones et al. .................... | 385/90 |
| 4,865,424 A | * | 9/1989 | Zupanick et al. ............ | 359/396 |
| 5,140,470 A | * | 8/1992 | Luecke ....................... | 359/818 |
| 5,419,522 A | * | 5/1995 | Luecke et al. .......... | 248/288.51 |
| 6,705,037 B2 | * | 3/2004 | Van Kirk ..................... | 42/126 |
| 2003/0192224 A1 | * | 10/2003 | Kirk ............................ | 42/124 |
| 2005/0237640 A1 | * | 10/2005 | Cipra ......................... | 359/820 |
| 2007/0009246 A1 | * | 1/2007 | Lee ............................. | 396/72 |

* cited by examiner

Primary Examiner—Kianni C Kaveh
(74) Attorney, Agent, or Firm—Brian F. Swienton (57) ABSTRACT

A device for supporting at least one optical component is disclosed and includes an optical component mount configured to engage and retain at least one optical component therein, a support member attached to the optical component mount, a support body having at least one longitudinal passage sized to receive the support member therein, the longitudinal passage in communication with at least one opening formed on the support body, a radial compression member in communication with the longitudinal passage and configured to radially compress the support member thereby coupling the support member to the support body, and at least one securing device attachable to the support body and configured to radially compress the radial compression member.

17 Claims, 10 Drawing Sheets

ADJUSTABLE SUPPORT DEVICE FOR OPTICAL COMPONENTS AND METHODS OF USE

This application claims the benefit of U.S. Provisional Patent App. Ser. No. 60/718,480, filed Sep. 19, 2005.

BACKGROUND

In the field of experimental optics adjustable mounts, supports, and post systems are commonly used to support and couple optical components to a work surface or optical table. Often, the performance of the optical system depends on the precision with which the optical elements and components are positioned. For example, imprecise positioning of a spatial filter within an optical system may result in a substantial degradation of system performance. Even a minute amount of movement of a single optical element can have a substantial effect on the optical system being implemented.

Figure 1:
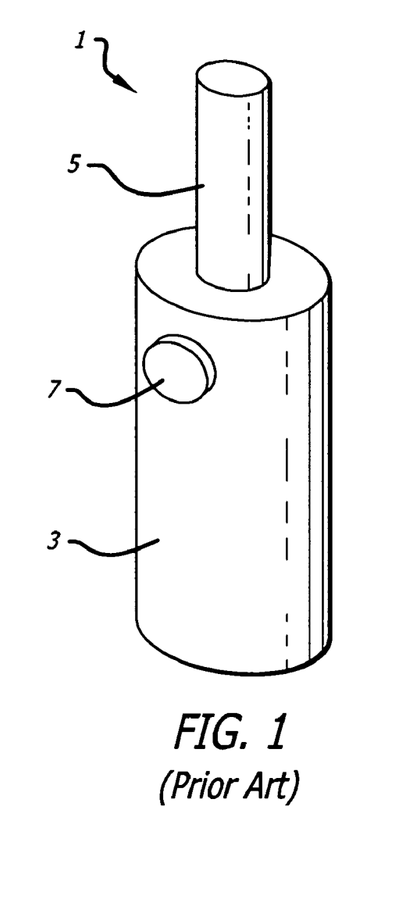
FIG. 1 shows a perspective view of an embodiment of a prior art optical support device.
Figure 2:
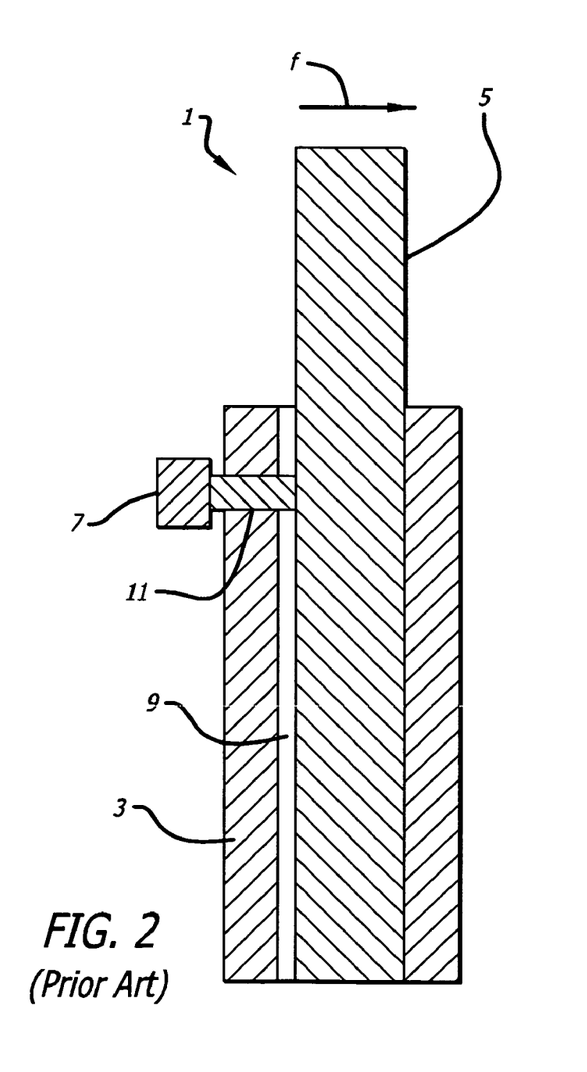
FIG. 2 shows a cross-sectional view of the prior art optical support device shown in FIG. 1.

Generally, optical post systems enable a user to adjustably secure one or more optical mounts to a work surface or mounting substrate. Typically, these optical post systems are manufactured in a time-consuming, labor intensive machining process from aluminum and/or stainless steel. FIGS. 1 and 2 show an exemplary embodiment of an optical post. As shown, typically the optical post 1 includes base 3 configured to be detachably secured to the mounting substrate. Further, the base 3 includes a central passage 9 sized to receive a post 5 therein. A lock member 7 is positioned within a lock member recess 11 formed in the base 3. The lock member 7 is configured to engage and apply an axial clamping force f to the post 5 positioned within the passage 9, thereby coupling the post 5 to the base 3. While these optical post devices have proven successful in the past, a number of shortcomings have been identified. For example, the application of the axial clamping force f introduces an undesirable lateral displacement of the post 5 within the passage of the base 3. As a result, an optical component supported thereby may not be positioned at the desired location.

In light of the foregoing, there is an ongoing need for an optical support device capable of precisely positioning one or more optical mounts within an optical system.

SUMMARY

Various embodiments of adjustable support devices for optical components are disclosed herein. In one embodiment, a device for supporting at least one optical component is disclosed and includes an optical mount configured to engage and retain at least one optical component therein, a support member attached to the optical component mount, a support body having at least one longitudinal passage sized to receive the support member therein, the longitudinal passage in communication with at least one opening formed on the support body, a radial compression member in communication with the longitudinal passage and configured to apply an omni-directional force equally distributed to the support member thereby coupling the support member to the support body, and at least one securing device attachable to the support body and configured to radially compress the radial compression member.

In another embodiment, the present application discloses a device for supporting at least one optical component and includes an optical mount configured to engage and retain at least one optical component therein, a support member attached to the optical component mount, a support body having at least one longitudinal passage sized to receive the support member therein, the longitudinal passage in communication with at least one opening formed on the support body, a radial compression member having one or more compressible extensions extending from the support body and in communication with the longitudinal passage, the compressible extensions configured to apply an omni-directional force equally distributed to the support member thereby coupling the support member to the support body, and at least one securing device attachable to the support body and configured to radially compress one or more compressible extensions of the radial compression member.

In still another embodiment, the present application discloses a device for supporting at least one optical component and includes an optical mount configured to engage and retain at least one optical component therein, a support member attached to the optical component mount, a support body having at least one compression wall formed on the support body proximate to a longitudinal passage formed therein, the at least one longitudinal passage sized to receive the support member therein, the longitudinal passage in communication with at least one opening formed on the support body, and a radial compression member detachably coupled to the support body and comprising at least one compressible fixture configured to engage the compression wall and be selectively compressed thereby, and at least one securing device attachable to the support body and configured to radially compress the radial compression member.

The present application also discloses a method of securely coupling an optical element to a work surface and includes securing at least one optical element with an optical mount, coupling the optical mount to a support member, coupling a support body to the work surface, positioning the support member within a longitudinal passage formed in the support body, actuating a securing member coupled to the support body to apply a radially compressive force to at least one radial compression member coupled to the support body, and coupling the support member to the support body by applying a radially compressive force thereto with the radial compression member.

Other features and advantages of the embodiments of adjustable support devices for optical components as disclosed herein will become apparent from a consideration of the following detailed description.

BRIEF DESCRIPTION OF THE DRAWINGS

Various adjustable support devices for optical components will be explained in more detail by way of the accompanying drawings, wherein.

DETAILED DESCRIPTION

Figure 3:
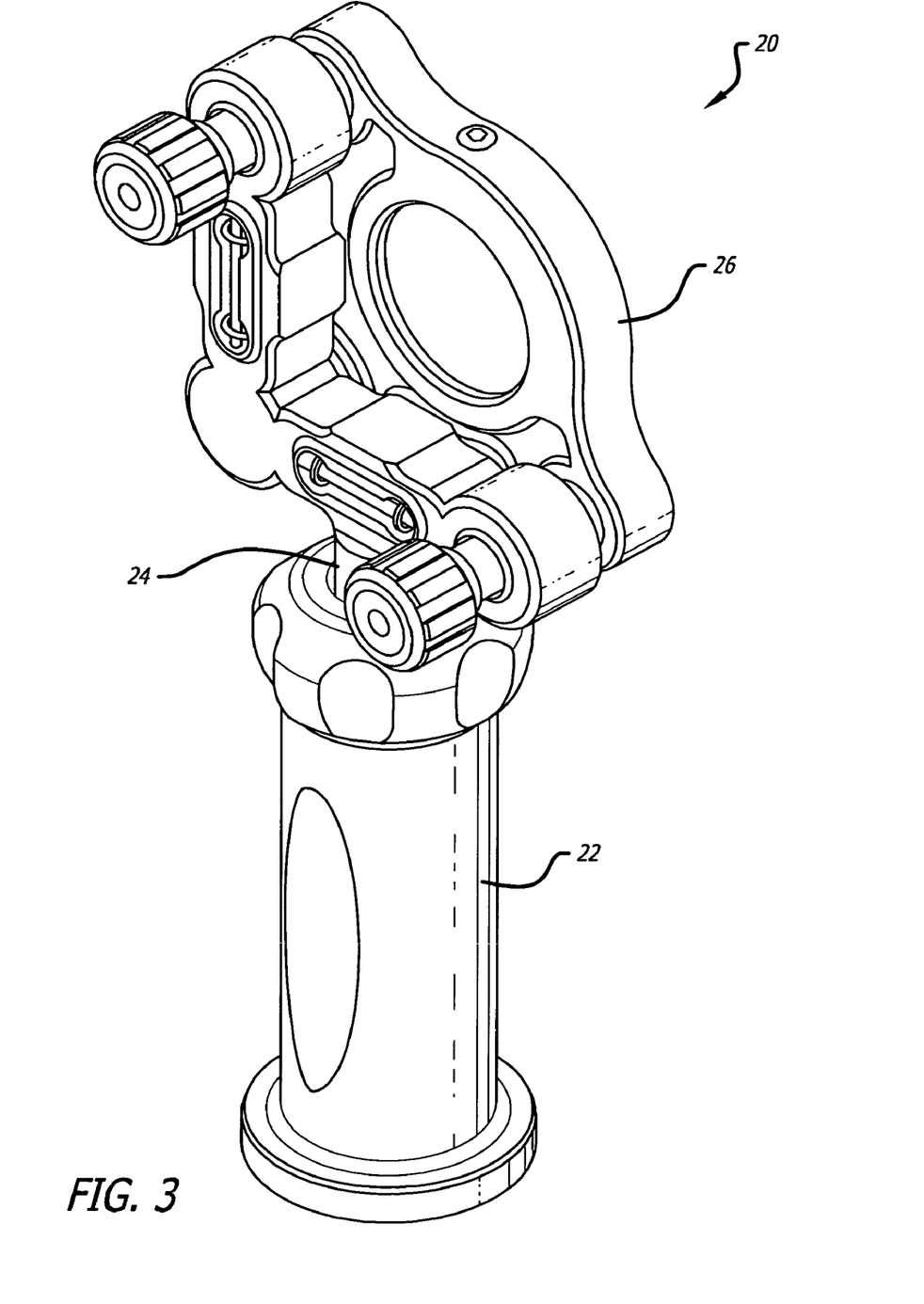
FIG. 3 shows a perspective view of an embodiment of an adjustable optical support device configured to support at least one optical component.

FIG. 3 shows an embodiment of a device for supporting at least one optical component. As shown, the support device 20 includes a support body 22 having a support member 24 coupled thereto. In the illustrated embodiment the support member 24 is adjustably and/or detachably coupled to the support body 22. As such, the height of support member 24 protruding from the support body 22 may be easily adjusted by the user. Optionally, the support member 24 may be non-adjustably and/or non-detachably coupled to the support body 22. At least one optical component mount 26 may be coupled to the support member 24. In the illustrated embodiment, the optical component mount 26 comprises a lens mount. Optionally, the optical component mount 26 may be configured to support any number and variety of optical components. Exemplary optical components include, without limitation, lasers, fiber optics, gratings, lenses, lens systems, mirrors, detectors, filters, modulators, plates, light sources, and the like.

Figure 4:
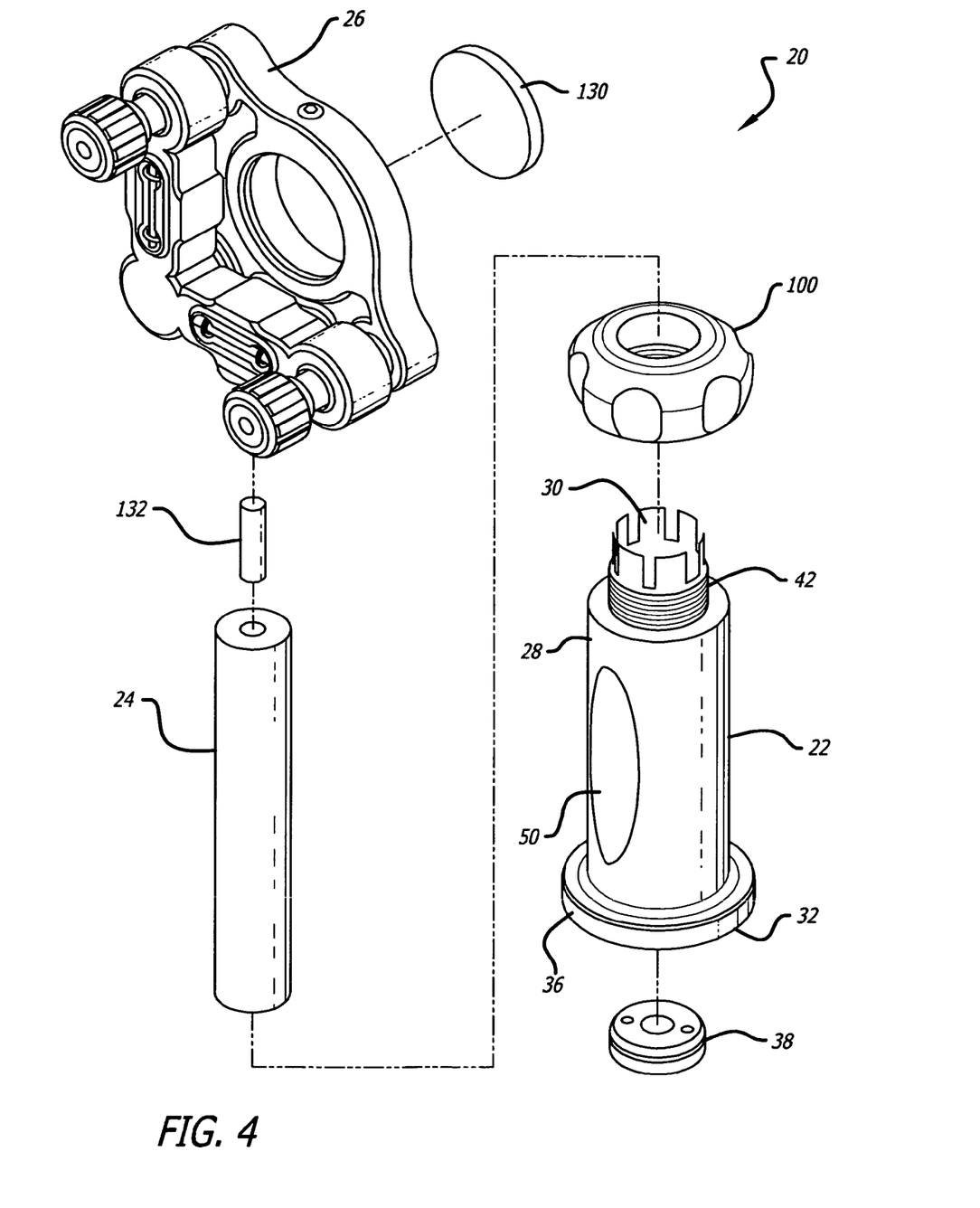
FIG. 4 shows an exploded view of the embodiment of the adjustable optical support device shown in FIG. 3.
Figures 5, 6:
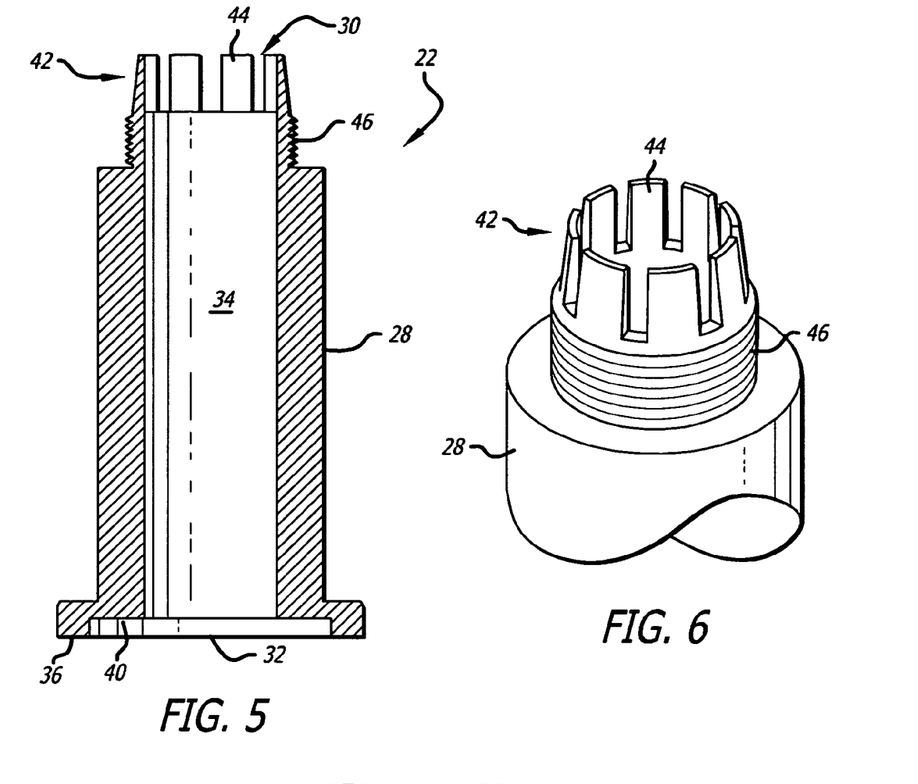
FIG. 5 shows a cross-sectional view of an embodiment of a support body for use with an adjustable optical support device.
FIG. 6 shows a perspective view of an embodiment of a radial compression member of an adjustable optical support device configured to radially secure a support member.

FIGS. 4 and 5 show various views of an embodiment of a support body for use with an optical support device. As shown, the support body 22 includes a base body 28 having at least a first opening 30 formed therein. In an alternate embodiment any number of openings may be formed in the base body 28. For example, a second opening 32 may be formed on the base body 28 (see FIG. 5). As shown in FIG. 5, the first and second openings 30, 32, respectively, are in communication with at least one body passage 34 formed therein. Optionally, the body passage 34 may be in communication with the first opening 30 or the second opening 32. In the illustrated embodiment, one or more mounting flanges 36 may be positioned on the base body 28. The mounting flange 36 may be configured to engage and be retained by one or more mounting clamps (not shown) coupled to a mounting substrate (not shown). The mounting flange 36 may be integral to the base body 28. In an alternate embodiment, the mounting flange 36 may be coupled to the base body 28 using any variety of coupling members. Exemplary coupling members include, without limitation, screws, bolts, friction fit members, thread members, adhesive materials, welds, solders, and the like.

As shown, at least one coupling device 38 may be configured to be positioned on or proximate to the mounting flange 36. Optionally, the coupling device 38 may be positioned within a coupling device recess 40 formed on the base body 28, the mounting flange 36, or both. In one embodiment, the coupling device 38 comprises a magnet member configured to be detachably coupled to the base body 28, thereby permitting the base body 28 to be magnetically coupled to a work surface. In an alternate embodiment, the coupling device 38 may be non-detachably coupled to the base body 28. Alternate coupling members include, without limitation, screws, bolts, adhesive devices, friction fit devices, and the like. Optionally, the support body 22 may be used or manufactured without a coupling member 38, a coupling member recess 40, or both.

Referring again to FIGS. 4 and 5, at least one a radial compression member 42 is positioned proximate to the first opening 30. Optionally, the radial compression member 42 may be located proximate to at least one of the first opening 30, the second opening 32, or anywhere on the base body 28. As shown, in the present embodiment the radial compression member 42 is integral to base body 28. Optionally, the radial compression member 42 may be detachable from the base body 28.

Figure 7:
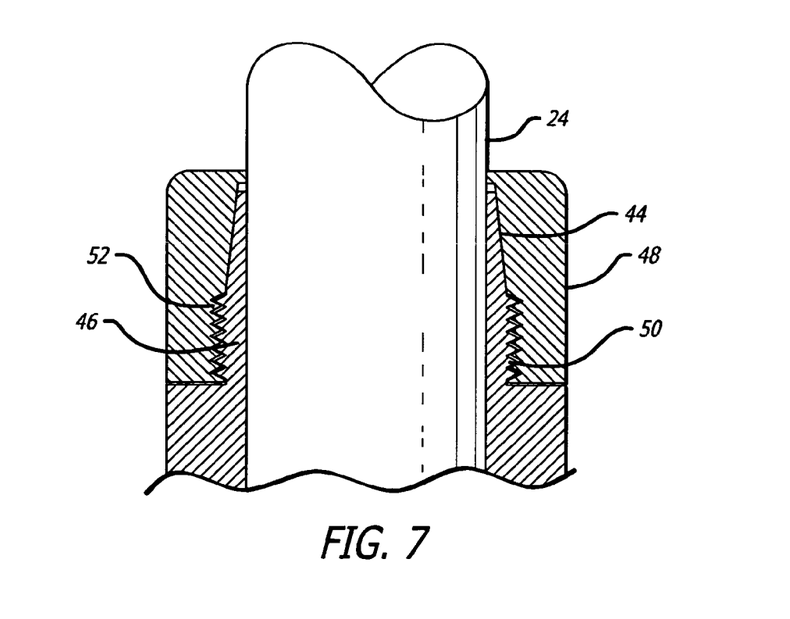
FIG. 7 shows a cross-sectional view of an embodiment of a support body securing a support member through the application of a radially compressive force.

FIGS. 6 and 7 show more detailed views of an embodiment of a radial compression member 42 positioned or formed on a base body 28. In the illustrated embodiment, the radial compression member 42 includes one or more compressible extensions 44 radially positioned about the first opening 30 formed on the base body 28. As such, the radial compression member 42 may form a continuous or discontinuous or split body. As shown, the compressible extensions 44 may be co-aligned with the longitudinal axis I of the body passage 34.

In one embodiment, the compressible extensions 44 may include one or more coupling members 46 formed thereon. The coupling members 46 may be configured to engage one or more securing devices 48 and radially compress the compressible extensions 44 in response thereto. For example, in the illustrated embodiment the coupling members 46 comprise one or more threads 50 formed on the compressible extensions 44 and configured to engage one or more thread members 52 formed on the securing device 48. In an alternate embodiment, the coupling member 46 may comprise one or more pins or tracks configured to engage and retain one or more securing devices 48. As shown in FIG. 7, the compressible extensions 44 of the radial compression member 42 are configured to radially engage and compressively secure the support member 24 within the support body 22 when the securing device 48 is applied thereto. Unlike prior art devices, the support member 24 is secured by the support body 22 without causing an undesirable deflection, movement or shift.

FIGS. 6 and 7 show more detailed views of an embodiment of a radial compression member 42 positioned or formed on a base body 28. In the Illustrated embodiment, the radial compression member 42 includes one or more compressible extensions 44 radially positioned about the first opening 30 formed on the base body 28. As such, the radial compression member 42 may form a continuous or discontinuous or split body. As shown, the compressible extensions 44 may be co-aligned with the longitudinal axis 1 of the body passage 34. In one embodiment, the compressible extensions 44 may include one or more coupling members 46 formed thereon. The coupling members 46 may be configured to engage one or more securing devices 48 and radially compress the compressible extensions 44 in response thereto. For example, in the illustrated embodiment the coupling members 46 comprise one or more threads 50 formed on the compressible extensions 44 and configured to engage one or more thread members 52 formed on the securing device 48. In an alternate embodiment, the coupling member 46 may comprise one or more pins or tracks configured to engage and retain one or more securing devices 48. As shown in FIG. 7, the compressible extensions 44 of the radial compression member 42 are configured to radially engage and apply an omni-directional force equally distributed to the support member 24 within the support body 22 when the securing device 48 is applied thereto. Unlike prior art devices, the support member 24 is secured by the support body 22 without causing an undesirable deflection, movement or shift.

Figure 8:
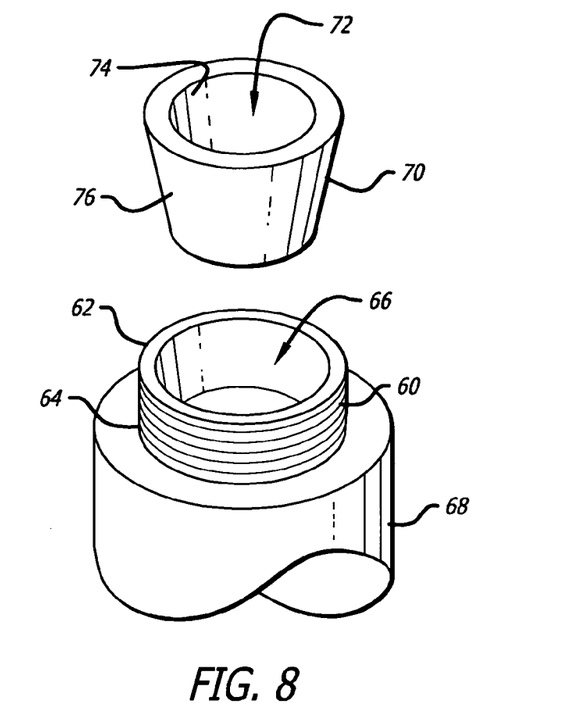
FIG. 8 shows an alternate embodiment of an adjustable optical support device including at least one compressible fixture to apply a radially compressive force to a support member.
Figure 9:
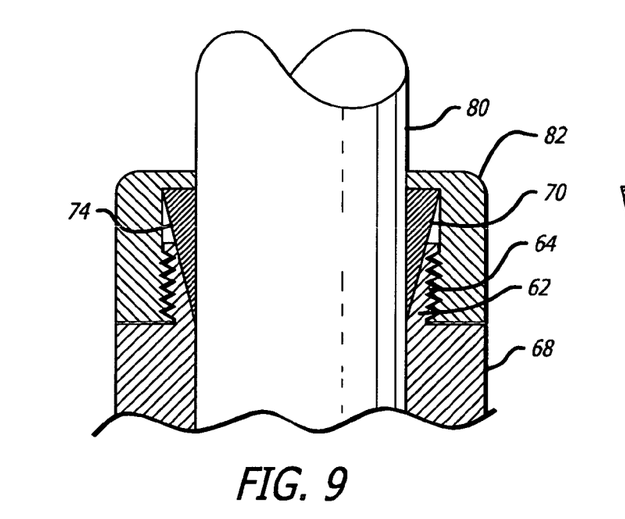
FIG. 9 shows a cross-sectional view of the adjustable optical support device of FIG. 7 radially compressing a support member.
Figure 10:
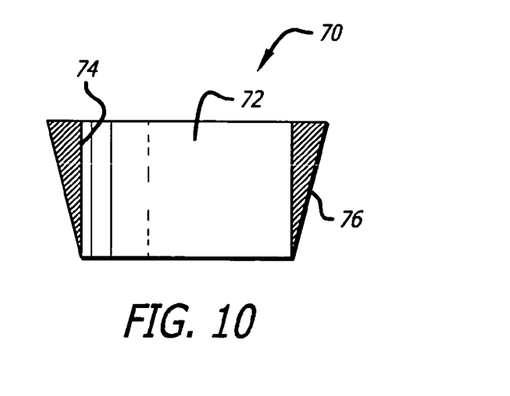
FIG. 10 shows a cross-sectional view of an embodiment of a compressible fixture for use with an adjustable optical support device.
Figure 11:
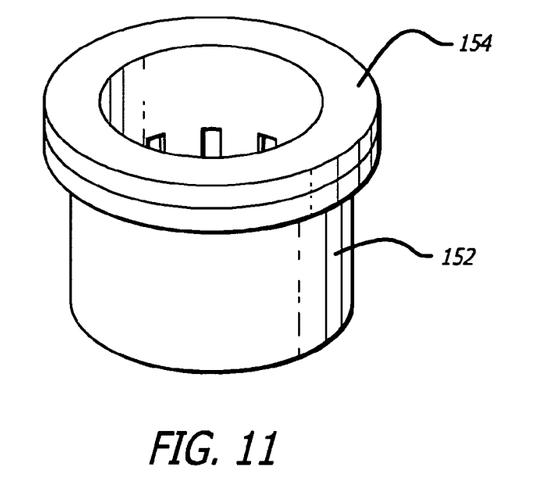
FIG. 11 shows a perspective view of another embodiment of compressible fixture for use with an adjustable optical support device.

FIGS. 8-10 show an alternate embodiment of a radial compression member for use with an optical support. As shown, the radial compression member 60 includes at least one compression wall 62. The compression wall 62 includes at least one coupling device 64 formed thereon. Like the previous embodiment, exemplary coupling members 64 include one or more threads, pins, tracks, lock members, slip fit devices, friction fit devices, and the like. The radial compression member 60 is positioned around or proximate to body passage 66 formed in the support body 68. The radial compression member 60 further includes at least one compressible fixture 70 sized to be received within the body passage 66 and configured to be radially compressed therein, thereby securing the support member positioned therein. In one embodiment, the compressible fixture may be selectively compressed by the radial compression member 60. As such, the compressible fixture 70 is configured to be radially compressed by the compression wall 62 formed on the support body 22. For example, the compressible fixture 70 may comprise a compression ferrule sized to be use with existing support body devices. Exemplary ferrule-based compressible fixtures 70 include "ferrule-pak" devices manufactured by Swagelock, Inc. Those skilled in the art will appreciate that the present embodiment permits a user to utilize a single support body to support a wide variety of support members simply by utilizing various size compression ferrules.

Referring again to FIGS. 8-10, in the illustrated embodiment the compressible fixture 70 may comprise a support member passage 72 formed by at least one compressing surface 74. Further, the compressing fixture 70 includes an engaging wall 76 configured to engage and be compressed by the compression wall 62 of the radial; compression member 60. In one embodiment the engaging wall 76 is angled. As such, the compression wall 62 of the radial compression member 60 may be similarly angled. Optionally, at least one of the engaging wall 76 and/or the compression wall 62 need not be angled. Optionally, the engaging wall 76 may form a continuous body or may include a slit S (see FIG. 8) thereby forming a split body.

Referring again to FIGS. 8-10, during use the compressible fixture 70 may be positioned within the body passage 66 and configured to be radially compressed by the radial compression member 60. As such, a support member 80 positioned within the body passage 66 of the support body 80 will be compressively secured by the compressive force applied by the interaction of the compressible fixture 70 and the compression wall 66. As shown in FIG. 9, a securing device 82 may be used to securely couple the compressible fixture 70 to the support body 68.

Figure 12:
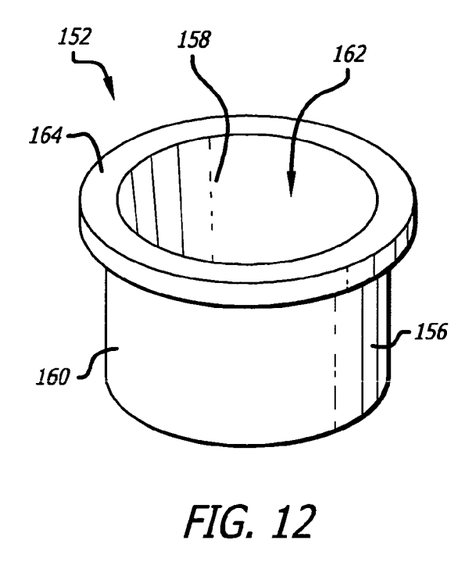
FIG. 12 shows a perspective view of an embodiment of a first support body of a the compressible fixture shown in FIG. 11.

FIGS. 11-16 show another embodiment of a compressible fixture for use with an optical support. As shown, the compressible fixture 150 includes a first support body 152 and at least a second support body 154. Referring to FIG. 12, the first support body 152 includes a first support body member 156 having an inner wall surface 158 and an outer wall surface 160 cooperatively defining a central passage 162. Further, the first support body 152 may include at least one mounting flange 164 formed thereon. In one embodiment, the mounting flange 164 may be configured to engage and be retained with an optical post device. As such, the outside diameter of the first support body 162 may be slightly smaller than the inside diameter of a passage formed within the optical post device.

Figure 13:
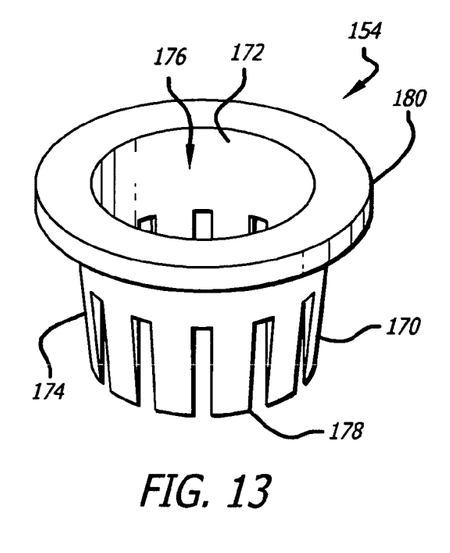
FIG. 13 shows a perspective view of an embodiment of a second support body of a the compressible fixture shown in FIG. 11.

The second support body 154 includes a second support body 170 having an inner wall surface 172 and an outer wall surface 174. The inner wall surface 172 may define a passage 176 therein. As shown in FIG. 13, the second support body 170 may include one or more radially compressible extensions 178. Further, the second support body 178 may be configured to be engaged by and radially compressed by the first support body 152. As such, the outer diameter of the second support body 170 may be smaller than the inner diameter of the first support body 152. In the illustrated embodiment, the second support body 170 includes a coupling flange 180 configured to engage the first support body 152.

Figure 14:
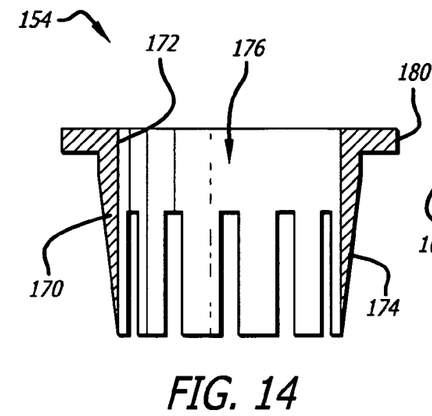
FIG. 14 shows a cross-sectional view of an embodiment of a second support body of a the compressible fixture shown in FIG. 13.
Figure 15:
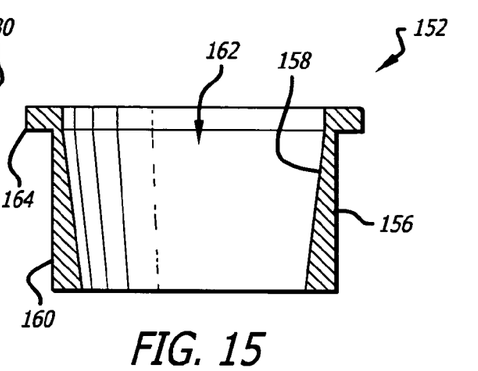
FIG. 15 shows a cross-sectional view of an embodiment of a first support body of a the compressible fixture shown in FIG. 12.
Figure 16:
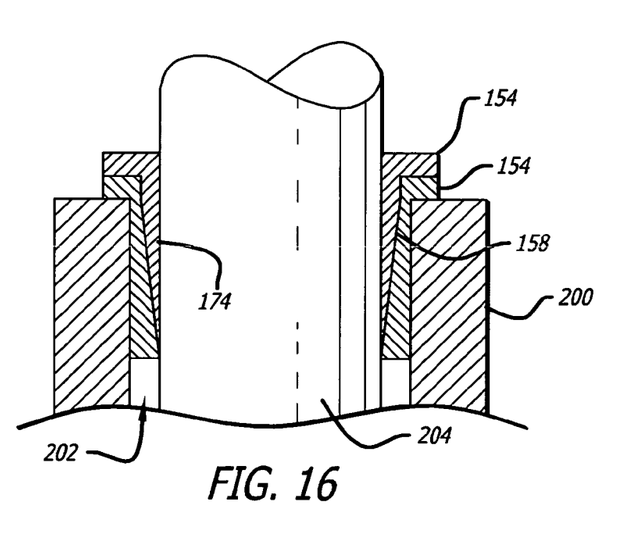
FIG. 16 shows a cross-section view of the compressible fixture of FIG. 11 positioned within a support body securing a support member.

FIGS. 14-16 show a cross-sectional view of an embodiment of a s compressible fixture for use with one or more optical devices during use. As shown, the outer wall surface 174 of the second support body 154 is radially compressed by the inner wall surface 158 of the first support body 152. In the illustrated embodiment, the inner wall surface 158 is angled to assist in radially compressing and securing the second support body 154. As such, the outer wall surface 174 of the second support body 154 may be similarly angled. Optionally, the inner wall surface 158 of the first support body 152 is not be angled. At least one optical post 204 is secured by the radially compressive force being applied thereto by the second support body 154. Further, the optical post 204, and the optical support member 150 may be positioned within an optical support device 202. Those skilled in the art will appreciate that the present embodiment may be easily adapted for use with an existing optical support device 202.

Figure 17:
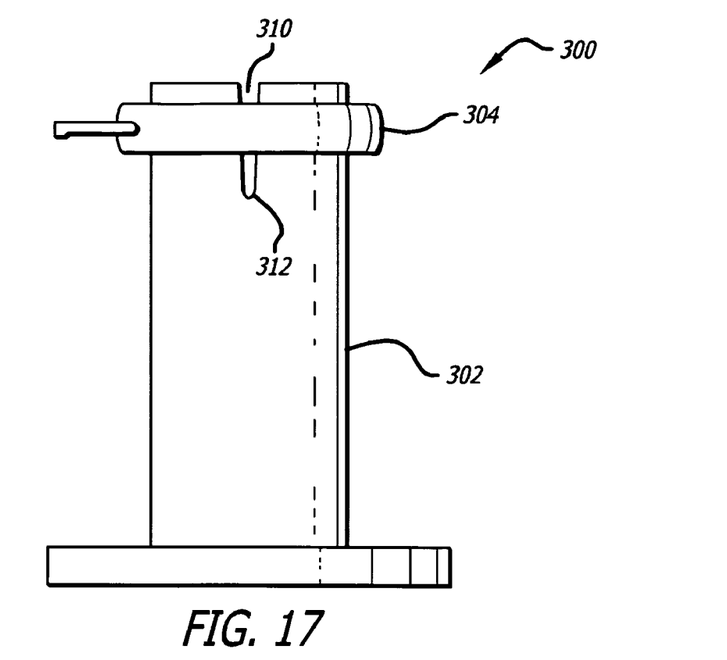
FIG. 17 shows a perspective view of another embodiment of an adjustable optical support device configured to support at least one optical component.
Figure 18:
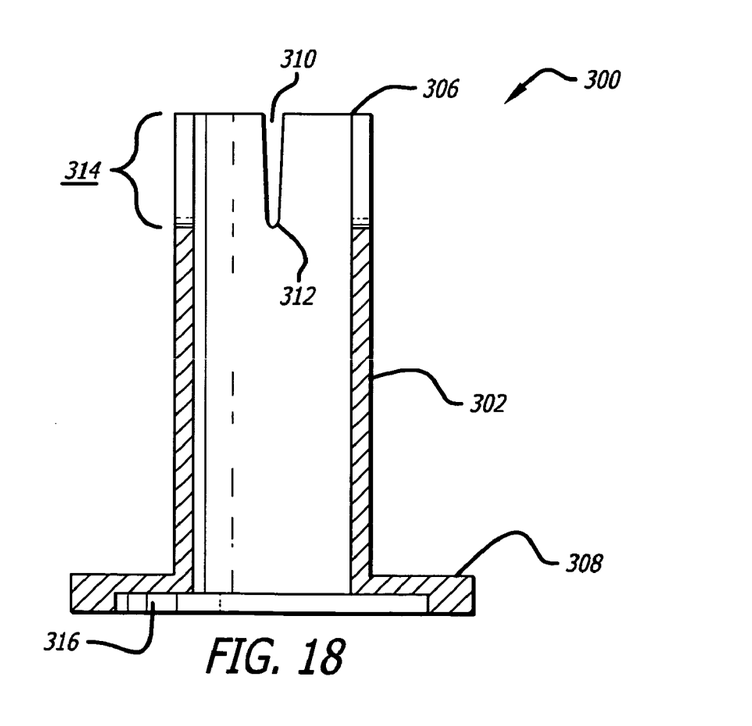
FIG. 18 shows a cross-sectional view of an embodiment of a support body for use with an adjustable optical support device.

FIGS. 17-23 show another embodiment of a support body for use with an optical support device. As shown in FIGS. 17 and 18, the support body 300 includes a body member 302 and a radial compression member 304. In one embodiment, the body member 302 may include a flange member 308 coupled or secured thereto. In the illustrated embodiment the flange member 308 include a mounting device recess 316 sized to receive at least one mounting device (not shown) formed therein. Optionally the flange member 308 may be integrally formed with the body member 302. In an alternate embodiment, the flange member 308 may be detachable from the body member 302. Optionally, the body member 302 may be manufactured without a flange member 308. As shown, at least one body passage 310 may be formed within the body member 302. Like the previous embodiments, the body passage 310 may be in communication with at least a first opening 306 formed in the body member 302.

Referring again to FIGS. 17 and 18, the body member 302 may include at least one compression relief 312 formed on thereon thereby forming a radially compressible region 314 formed on the body member 302 proximate to the compression relief(s) 312. As such, when compressed, the transverse dimension of the body member 302 within the radially compressible region 314 may be less then the transverse dimension of the body member 302 in a non-compressed region.

Figure 19:
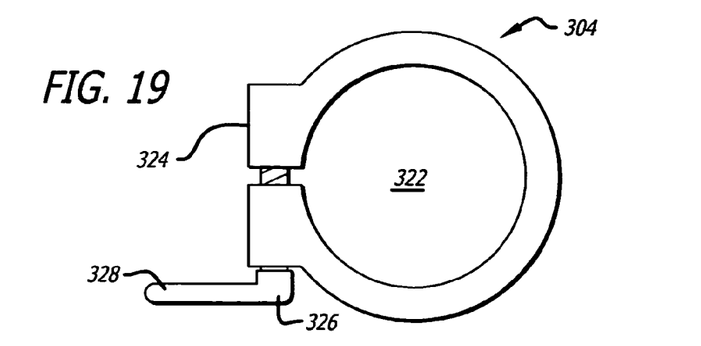
FIG. 19 shows a top perspective view of an embodiment of a radial compression member for use with an adjustable optical support device.
Figures 20, 21, 22:
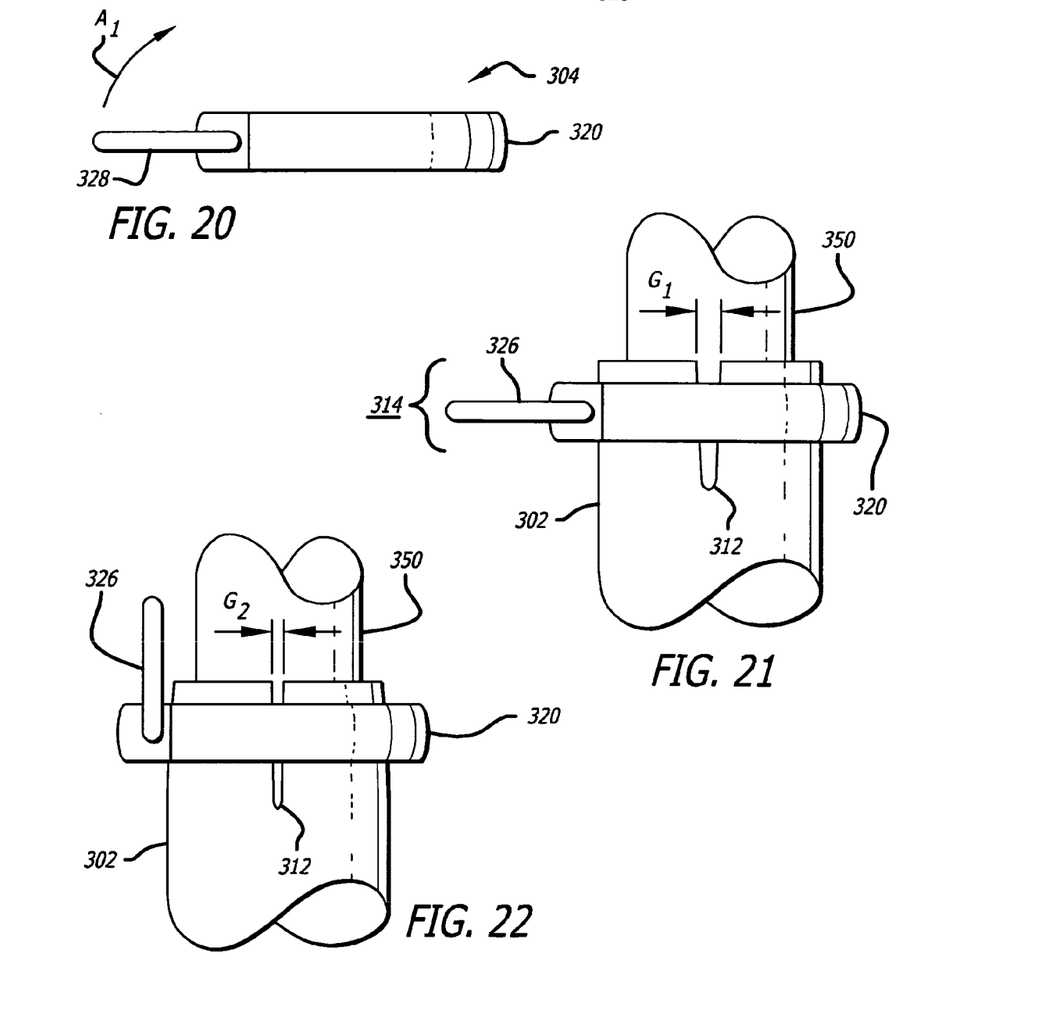
FIG. 20 shows a side perspective view of an embodiment of a radial compression member for use with an adjustable optical support device.
FIG. 21 shows a side view of an embodiment of an adjustable optical support device during use.
FIG. 22 shows another side view of an embodiment of an adjustable optical support device during use.

FIGS. 19 and 20 show an embodiment of a radial compression device for use with an optical support. As shown, the radial compression device 304 comprises a compression body 320 having a compression orifice 322 formed therein. Further, the compression body 320 may include a compression fitting 324 formed thereon. In the illustrated embodiment, the compression fitting 324 includes at least one thread or a threaded relief sized to receive at least one threaded member 326 therein. As such, the transverse dimension of the compression orifice 322 may be controllable altered by actuating the threaded member 326. For example, as shown in FIG. 20, the threaded member 326 may include a lever device 328 such that movement of the lever device 328 along arc A1 results in the actuation of the threaded member 326 thereby decreasing the transverse dimension of the compression orifice 322. In an alternate embodiment, the compression orifice may be altered using a cam action. Optionally, the lever device 328 may comprise a quick-release clamping device.

FIGS. 21 and 22 of the present application show an embodiment of a support body and a radial compression member during use. As shown in FIG. 21, the user may position the radial compression member 320 on the body member 302 within the compression region 314. Thereafter, at least one optical post or support member 350 may be positioned within the body passage 310. As shown in FIG. 21 the radial compression member 320 is not providing a radially compressive force to the body member 302. As such, the compression relief 312 forms a first gap G1. As shown in FIG. 22, once the optical post 350 is suitably positioned, the threaded member 326 may be actuate. As a result, the radial compression member 320 applies a radially compressive force to the body member 302 thereby decreasing the size of the compression relief 312 to a second gap G2 wherein G2 is less than G1. As a result, a radially compressive force is applied to the optical post 350 positioned within the body member 302 thereby securing the optical post 350.

Figure 23:
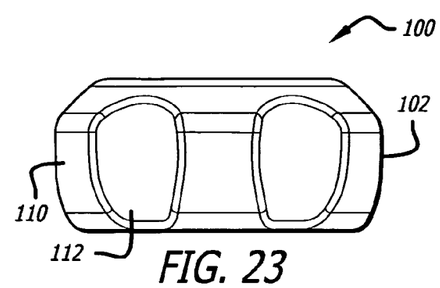
FIG. 23. shows a side view of an embodiment of a securing device for use with an adjustable optical support device.
Figure 24:
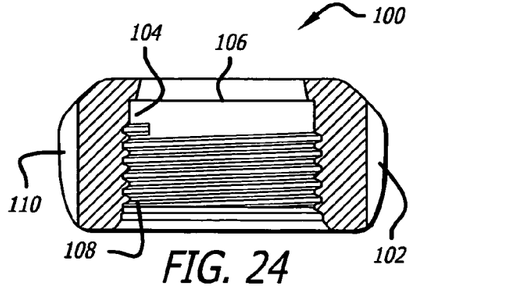
FIG. 24 shows a cross-sectional view of an embodiment of a securing device for use with an adjustable optical support device.
Figure 25:
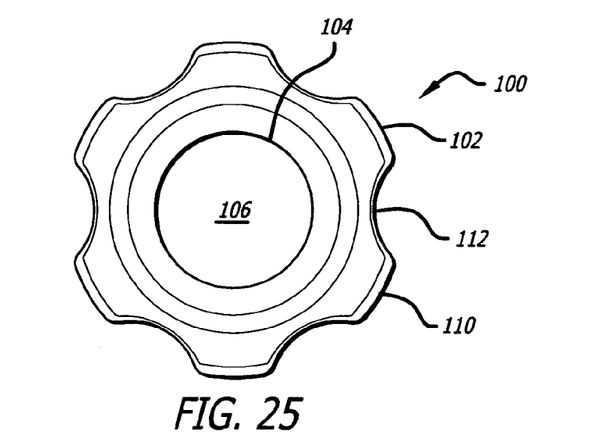
FIG. 25 shows a perspective view of an embodiment of a securing device for use with an adjustable optical support device.

FIGS. 23-25 show an embodiment of a securing device for use with an optical support. As shown, the securing device 100 comprises a device body 102 having an interior wall 104 defining a passage 106. In one embodiment, the interior wall 104 of the securing device 100 includes one or more thread members 108 formed thereon. During use, the thread members 108 are configured to engage and retain the coupling members 46 formed on a compressible extension 46 (see FIG. 7). Any variety of alternate coupling devices may be used to couple the securing device 100 to the support body of a support device. The device body 102 further includes at least one exterior wall 110. The exterior wall 110 may include one or more actuation features 112 formed thereon. Exemplary gripping features include, without limitation, cut outs, bumps, ridges, surface irregularities, and the like configured to enhance a user grip on the securing device 100.

Figure 26:
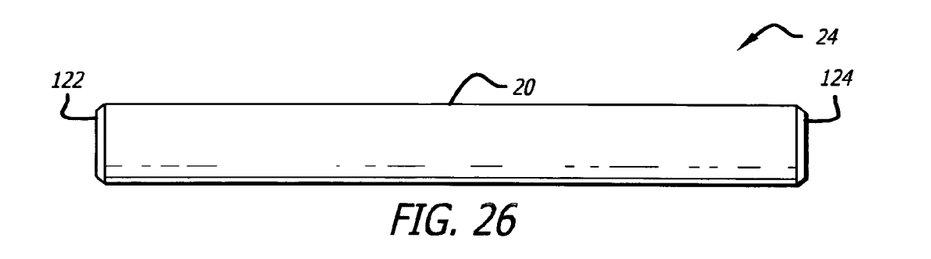
FIG. 26 shows a cross-section view of an embodiment of a support member for use with an adjustable optical support device.
Figure 27:
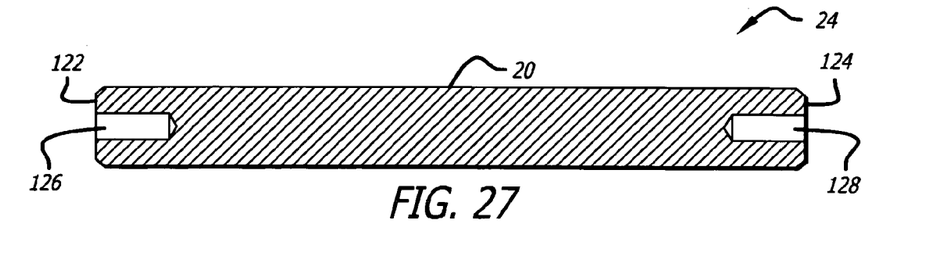
FIG. 27 shows a cross-sectional view of an embodiment of a support member for use with an adjustable optical support device.

FIGS. 26 and 27 show an embodiment of a support member for use with an optical support device. As shown, the support member 24 includes a support member body 120 having a first end 122 and at least a second end 124. In the illustrated embodiment, the first end 122 includes a first recess 126. Similarly, the second end 124 includes a second recess 128. The first and second recesses 126,128, respectively, are configured to receive at least one fastener (not shown) therein. For example, at least one of the first and second recesses, 126, 128, respectively, may include a threaded portion configured to have at least one screw coupled thereto. Optionally, the first and second recesses, 126, 128, respectively, may be configured to detachably couple to any variety of fasteners, including, without limitation, screws, bolts, pins, slip-fit devices, snap devices, magnet couplers, and the like. As such, one or more optical mounts (not shown) may easily be coupled to the support member 24. Optionally, one or more optical mounts may be non-detachably secured to the support member 24. Like the support body 22 and the various components thereof, the support member 24 may be manufactured from any variety or combination of materials. For example, the support member 24 may be manufactured from aluminum, stainless steel, titanium, steels, metallic alloys, brass, plastics, natural minerals, ceramics, elastomers, aerogels, composite materials, kevlar, carbon fiber, glass-impregnated plastics, glass reinforced materials, wood, glass, and the like. As such, the support member 24 may be manufactured in any variety of shapes and lengths. For example, in the illustrated embodiment the support member 24 comprises a substantially cylindrical body. During use, the support member 24 may be configured to be concentrically positioned within a body passage formed within an optical support.

The present application further discloses a method of securely coupling an optical element to a work surface. Referring to FIG. 4, the user may engage at least one optical element 130 with an optical component mount 26. Thereafter, the optical component mount 26 may be coupled to the support member 24 using a fastening device 132. Exemplary fastening devices include, without limitation, screws, bolts, pins, magnets, and the like. The support body 22 may be securely coupled to a work surface using any variety of coupling devices. In the illustrated embodiment, the support body 22 includes a coupling device 38 positioned therein. In an alternate embodiment, a clamping device (not shown) may be used to engage the mounting flange 36 formed on the support body 22. Thereafter, the use may loosen the securing device 100 thereby permitting the support member 24 to be inserted into the body passage 34 (See FIG. 5) formed in the support body 22. Once positioned at a desired height, the user may tighten the securing device 100 thereby resulting in the radial compression member 42 radially engaging the support member 24 and compressively securing the support member 24.

The various embodiments disclosed herein are illustrative of the principles of the invention. Other modifications capable of applying a radially compressive, omni-directional force to a support member positioned therein may be employed which are within the scope of the invention. Accordingly, the devices disclosed in the present application are not limited to that precisely as shown and described herein.

What is claimed is:

1. A device for supporting at least one optical component, comprising:
    an optical component mount configured to engage and retain at least one optical component therein;
    a support member attached to the optical component mount;
    a support body having at least one longitudinal passage sized to receive the support member therein, the longitudinal passage in communication with at least one opening formed on the support body;
    a radial compression member in communication with the longitudinal passage and configured to apply an omni-directional force equally distributed to the support member thereby coupling the support member to the support body; and
    at least one securing device attachable to the support body and configured to radially compress the radial compression member.

2. The device of claim 1 wherein the optical component mount is detachably coupled to the support member.

3. The device of claim 1 wherein the optical component mount non-detachably secured to the support member.

4. The device of claim 1 wherein the optical component comprises at least one device selected from the group consisting of lasers, lenses, lens systems, fiber optics, gratings, mirrors, detectors, filters, modulators, plates, and light sources.

5. The device of claim 1 wherein the support member is manufactured from at least one material selected from the group consisting of aluminum, stainless steel, titanium, steel, metallic alloys, brass, plastic, polymers, ceramics, elastomers, aerogels, composite materials, kevlar, carbon fiber, glass-impregnated polymers, glass reinforced material, wood, and glass.

6. The device of claim 1 wherein the support body comprises a base body having a first opening and a second opening formed thereon, the first and second openings in communication with the longitudinal passage formed therein.

7. The device of claim 1 further comprising at least one mounting flange positioned on the support body.

8. The device of claim 7 wherein the mounting flange is integral to the support body.

9. The device of claim 1 wherein the radial compression member comprises one or more compressible extensions having one or more coupling devices formed thereon.

10. The device of claim 9 wherein the coupling member comprises one or more threads formed on the compressible extension.

11. The device of claim 1 wherein the radial compression member is non-detachably coupled to the support body.

12. The device of claim 1 wherein the at least a portion of the radial compression member is detachable from the support body.

13. The device of claim 12 wherein the radial compression member comprises:
    a first support body having an angled inner wall forming a central passage; and
    a second support body having an angled outer wall and configured to be radially compressed by the first support body.

14. The device of claim 12 wherein the radial compression member further comprises:
    at least one compression wall formed on the support body proximate to the longitudinal passage; and
    at least one compressible fixture configured to engage the compression wall and be selectively compressed thereby.

15. The device of claim 1 wherein the support body is manufactured from at least one material selected from the group consisting of aluminum, stainless steel, titanium, steel, metallic alloys, brass, plastic, ceramics, elastomers, aerogels, composite materials, kevlar, carbon fiber, glass-impregnated plastic, glass reinforced material, wood, and glass.

16. A device for supporting at least one optical component, comprising:
    an optical component mount configured to engage and retain at least one optical component therein;
    a support member attached to the optical component mount;
    a support body having at least one longitudinal passage sized to receive the support member therein, the longitudinal passage in communication with at least one opening formed on the support body;
    a radial compression member having one or more compressible extensions extending from the support body and in communication with the longitudinal passage, the compressible extensions configured to apply an omni-directional force equally distributed to the support member thereby coupling the support member to the support body; and
    at least one securing device attachable to the support body and configured to radially compress one or more compressible extensions of the radial compression member.

17. The device of claim 16 wherein at least one of the support body and the support member in manufactured from at least one material selected from the group consisting of aluminum, stainless steel, titanium, steel metallic alloys, brass, plastic, ceramics, elastomers, aerogels, composite materials, kevlar, carbon fiber, glass-impregnated plastic, glass reinforced material, wood, and glass.

* * * * *